(12) United States Patent
Di Palma

(10) Patent No.: US 10,950,991 B2
(45) Date of Patent: Mar. 16, 2021

(54) MULTIPLE UNIT CHARGE CORD ASSEMBLY

(71) Applicant: Pasquale Di Palma, Belleville, NJ (US)

(72) Inventor: Pasquale Di Palma, Belleville, NJ (US)

(*) Notice: Subject to any disclaimer, the term of this patent is extended or adjusted under 35 U.S.C. 154(b) by 0 days.

(21) Appl. No.: 16/419,085

(22) Filed: May 22, 2019

(65) Prior Publication Data

US 2020/0373715 A1  Nov. 26, 2020

(51) Int. Cl.
| | |
|---|---|
| H01R 13/72 | (2006.01) |
| H02J 7/00 | (2006.01) |
| H01R 33/94 | (2006.01) |
| H01R 33/90 | (2006.01) |
| H01R 13/60 | (2006.01) |

(52) U.S. Cl.
CPC ............. *H01R 13/72* (2013.01); *H01R 13/60* (2013.01); *H01R 33/90* (2013.01); *H01R 33/94* (2013.01); *H02J 7/0045* (2013.01)

(58) Field of Classification Search
CPC ........ H01R 13/60; H01R 13/72; H01R 33/94; H01R 33/90; H02J 7/0045
USPC ........................ 439/4, 501, 528; 191/12.2 R
See application file for complete search history.

(56) References Cited

U.S. PATENT DOCUMENTS

| | | | |
|---|---|---|---|
| 7,255,595 B2* | 8/2007 | Lo | H01R 13/701 439/4 |
| D667,823 S | 9/2012 | Merenda | |
| 8,873,250 B2 | 10/2014 | Kroups | |
| 9,407,048 B2 | 8/2016 | George | |
| 9,654,606 B1 | 5/2017 | Warren | |
| 9,762,013 B2* | 9/2017 | George | H04R 1/1033 |
| 9,923,312 B2* | 3/2018 | Laube | B65H 75/4442 |
| 10,069,951 B2* | 9/2018 | Enojado | H04M 1/04 |
| 2002/0023814 A1* | 2/2002 | Poutiatine | H02G 11/02 191/12.2 R |
| 2009/0161332 A1* | 6/2009 | Chien | H01R 25/003 361/811 |
| 2013/0320925 A1* | 12/2013 | Yu | H02J 7/0042 320/111 |
| 2014/0253038 A1 | 9/2014 | Posa | |
| 2015/0364875 A1 | 12/2015 | Ginsberg | |

FOREIGN PATENT DOCUMENTS

WO  WO2017/208224  12/2017

* cited by examiner

*Primary Examiner* — Abdullah A Riyami
*Assistant Examiner* — Justin M Kratt

(57) ABSTRACT

A multiple unit charge cord assembly includes a housing coupled to a back side of an electronic device. A button movably coupled to the housing is urgeable into a releasing position. A first spool rotatably positioned within the housing is biased to rotate when the button is urged into the releasing position and the first spool is rotatable in a second direction. A second spool rotatably positioned within the housing is biased to rotate when the button is urged into the releasing position and the second spool is rotatable in a secondary direction. A first cord is wrapped around the first spool. The first cord is urgeable to rotate the first spool. A first plug is electrically coupled to the first cord. A second cord is wrapped around the second spool and is urgeable to rotate the second spool. A second plug is electrically coupled to the second cord.

7 Claims, 4 Drawing Sheets

MULTIPLE UNIT CHARGE CORD ASSEMBLY

CROSS-REFERENCE TO RELATED APPLICATIONS

Statement Regarding Federally Sponsored Research or Development

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relates to charge cord devices and more particularly pertains to a new charge cord device for ensuring a charge cord is always with an electronic device.

BRIEF SUMMARY OF THE INVENTION

An embodiment of the disclosure meets the needs presented above by generally comprising a housing that is coupled to a back side of an electronic device such that the housing is transported with the electronic device. A button is movably coupled to the housing and the button is urgeable into a releasing position. A first spool is rotatably positioned within the housing. The first spool is biased to rotate in a first direction when the button is urged into the releasing position and the first spool is rotatable in a second direction. A second spool is rotatably positioned within the housing. The second spool is biased to rotate in a primary direction when the button is urged into the releasing position and the second spool is rotatable in a secondary direction. A first cord is wrapped around the first spool when the first spool rotates in the first direction. The first cord is urgeable off of the first spool to rotate the first spool in the second direction. A first plug is electrically coupled to the distal end of the first cord to be electrically coupled to the electronic device. A second cord is wrapped around the second spool when the second spool rotates in the primary direction and the second cord is urgeable off of the second spool to rotate the second spool in the secondary direction. A second plug is electrically coupled to the distal end of the second cord to be electrically coupled to a power source for charging the electronic device.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
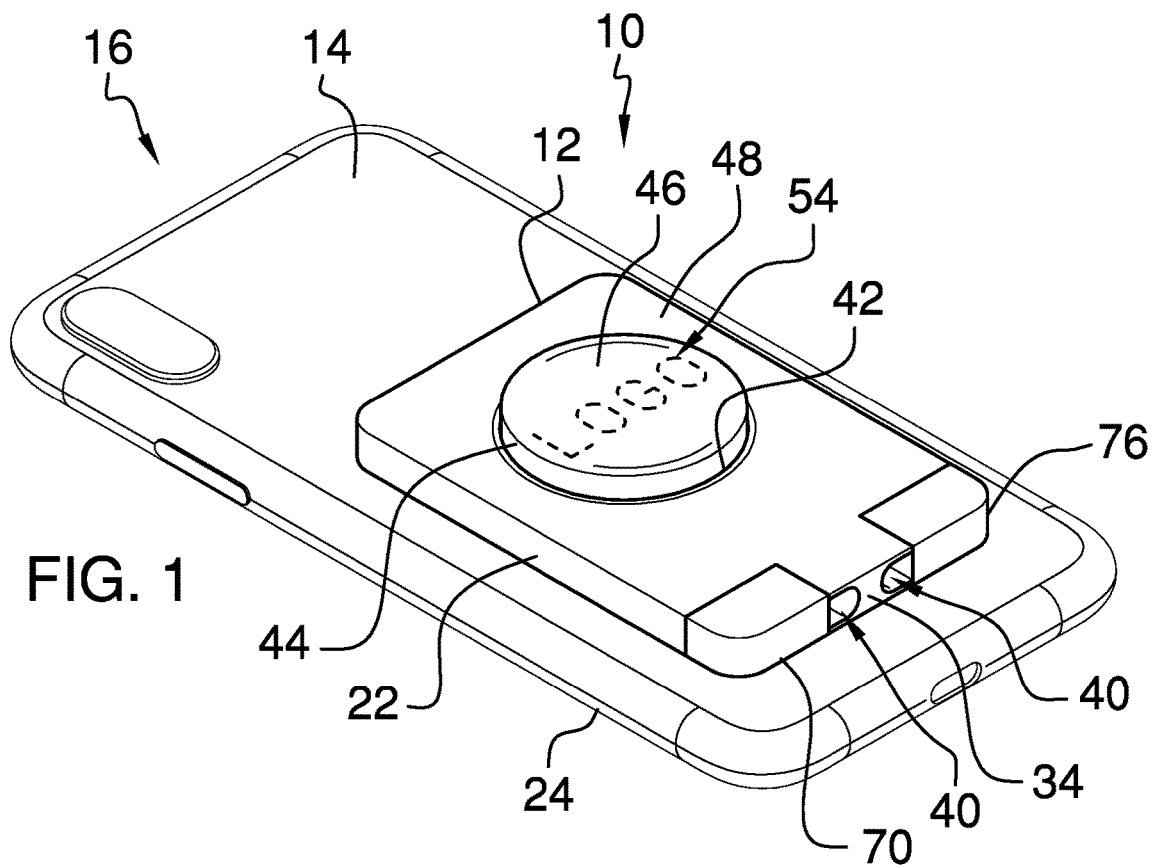
FIG. 1 is a front perspective view of a multiple unit charge cord assembly according to an embodiment of the disclosure being mounted on an electronic device.
Figure 2:
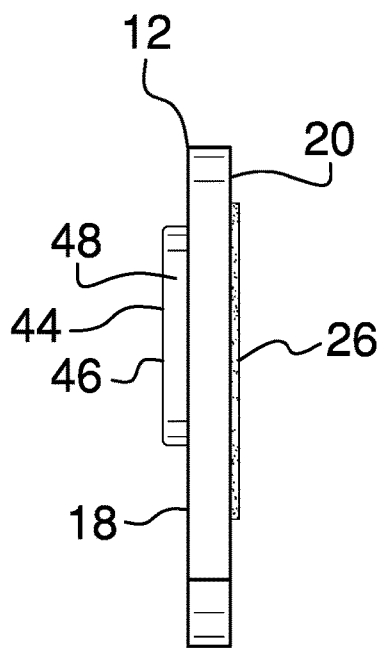
FIG. 2 is a right side view of an embodiment of the disclosure.
Figure 3:
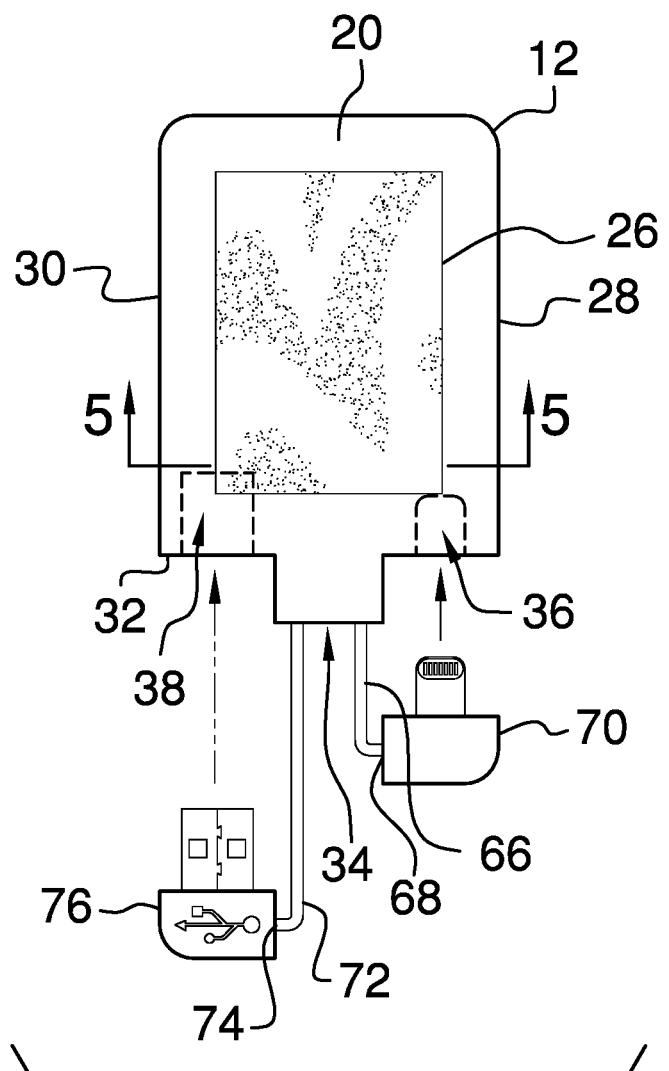
FIG. 3 is a back exploded view of an embodiment of the disclosure.
Figure 4:
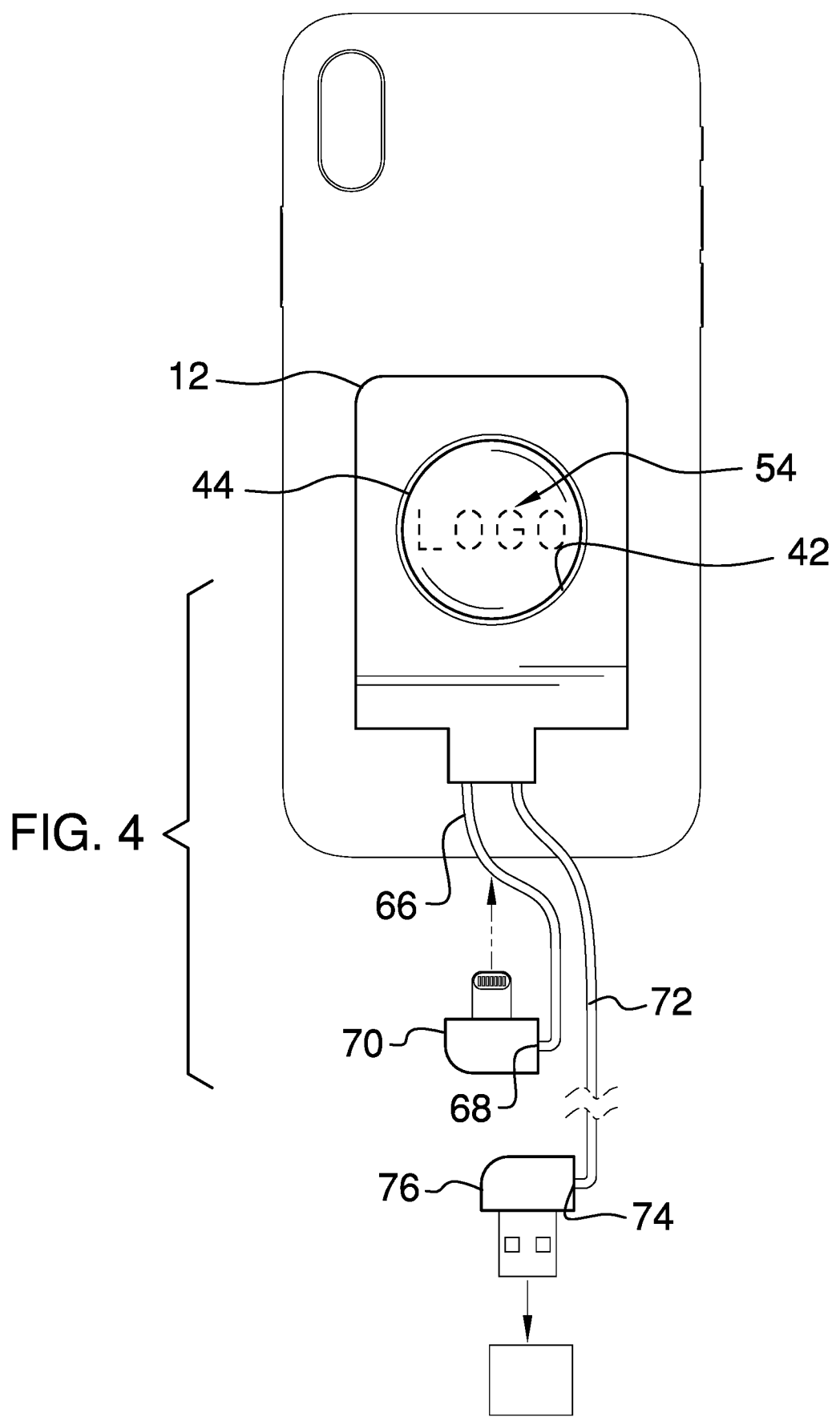
FIG. 4 is a perspective in-use view of an embodiment of the disclosure.
Figure 5:
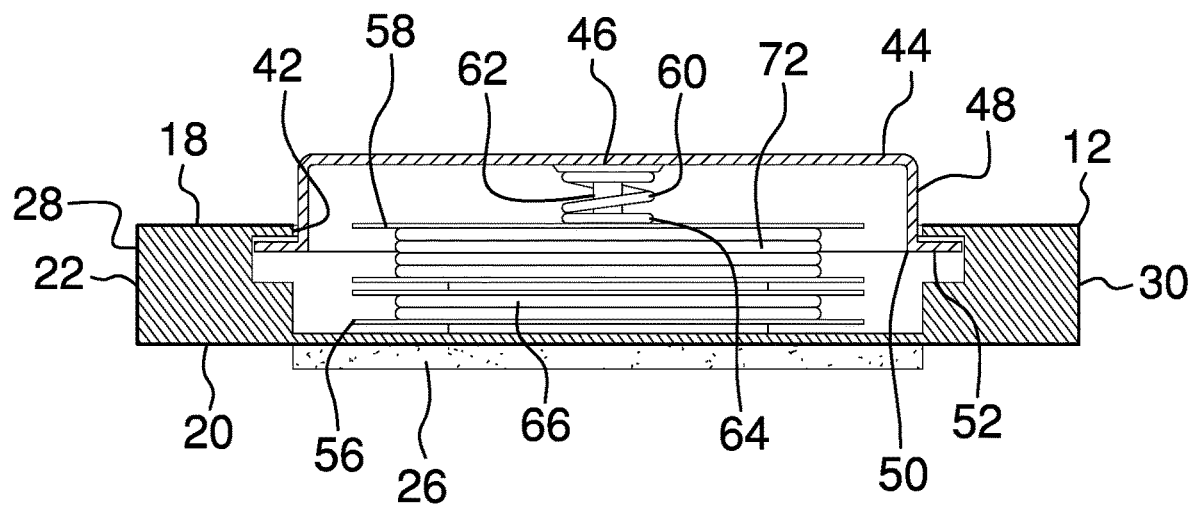
FIG. 5 is a cross sectional view taken along line 5-5 of FIG. 3 of an embodiment of the disclosure.

With reference now to the drawings, and in particular to FIGS. 1 through 5 thereof, a new charge cord device embodying the principles and concepts of an embodiment of the disclosure and generally designated by the reference numeral 10 will be described.

As best illustrated in FIGS. 1 through 5, the multiple unit charge cord assembly 10 generally comprises a housing 12 that is coupled to a back side 14 of an electronic device 16 such that the housing 12 is transported with the electronic device 16. The electronic device 16 may be a smart phone or other similar electronic device that has a rechargeable battery. The housing 12 has a front wall 18, a back wall 20 and a perimeter wall 22 extending therebetween. The back wall 20 is positioned on the back side 14 of the electronic device 16 to facilitate the front side 24 of the electronic device 16 to be visible. An adhesive layer 26, or the like, is coupled to the back wall 20 of the housing 12 to engage the back side 14 of the electronic device 16.

The perimeter wall 22 has a first lateral side 28, a second lateral side 30 and a lower side 32, the lower side 32 has an extended portion 34 extending away from the lower side 32 and the extended portion 34 is centrally positioned on the lower side 32. The lower side 32 has a first well 36 extending inwardly toward an interior of the housing 12 and the first well 36 is positioned between the extended portion 34 and the first lateral side 28. The lower side 32 has a second well 38 extending inwardly toward the interior of the housing 12 and the second well 38 is positioned between the extended portion 34 and the second lateral side 30. The lower side 32 has a pair of conductor apertures 40 each extending into the interior of the housing 12 and each of the conductor apertures 40 is positioned on the extended portion 34. Additionally, the front wall 18 has an opening 42 extending into the interior of the housing 12.

A button 44 is provided and the button 44 is movably coupled to the housing 12. The button 44 has a forward wall 46 and an outer wall 48 extending away from the forward wall 46. The outer wall 48 is continuously arcuate about a center point of the forward wall 46 such that the button 44 has a circular shape. The outer wall 48 has a distal edge 50 with respect to the forward wall 46 and the outer wall 48 has a lip 52 extending outwardly therefrom. The lip 52 is aligned with the distal edge 50 and the lip 52 extends around an entire circumference of the outer wall 48. The outer wall 48 extends through the opening 42 in the front wall 18 of the housing 12 having the lip 52 being positioned within the housing 12 and having the forward wall 46 being exposed. Thus, the forward wall 46 can be pushed by a user. Indicia 54, such as a logo or an image, may be printed on the forward wall 46.

A first spool 56 is rotatably positioned within the housing 12 and the first spool 56 is biased to rotate in a first direction. The first spool 56 is rotatable in a second direction and the first spool 56 has a rotational axis extending through the front 18 and back 20 walls of the housing 12. A second spool 58 is rotatably positioned within the housing 12 and the second spool 58 is biased to rotate in a primary direction. The second spool 58 is rotatable in a secondary direction. The second spool 58 has a rotational axis extending through the front 18 and back 20 walls of the housing 12. Additionally, the first spool 56 is positioned between the second spool 58 and the back wall 20 of the housing 12. Each of the first 56 and second 58 spools may be spring loaded retracting spools or the like.

A biasing unit 60 is positioned between the second spool 58 and the forward wall 46 of the button 44. The biasing unit 60 biases the button 44 away from the second spool 58 such that the lip 52 on the outer wall 48 of the button 44 frictionally engages the front wall 18 of the housing 12. Each of the first 56 and second 58 spools is inhibited from rotating in the respective first and primary directions when the button 44 is biased away from the second spool 58. The lip 52 is spaced from the front wall 18 of the housing 12 when the forward wall 46 of the button 44 is depressed thereby facilitating each of the first 56 and second 58 spools to rotate in the respective first and primary directions. The biasing unit 60 may include, as pictured in FIG. 5, a shaft 62 and a spring 64 each extending between the second spool 58 and the forward wall 46 of the button 44. The biasing unit 60 may comprise, not pictured, other mechanisms common to retracting cord spools.

A first cord 66 is wrapped around the first spool 56 when the first spool 56 rotates in the first direction. The first cord 66 is urgeable off of the first spool 56 to rotate the first spool 56 in the second direction. The first cord 66 has a distal end 68 with respect to the first spool 56 and the first cord 66 extends outwardly through a respective one of the conductor apertures 40 in the extended portion 34 of the lower side 32 of the perimeter wall 22 of the housing 12 having the distal end 68 of the first cord 66 being exposed. A first plug 70 is electrically coupled to the distal end 68 of the first cord 66 and the first plug 70 can be electrically coupled to the electronic device 16. The first plug 70 is insertable into the first well 36 for storage having a back side 14 of the first plug 70 being flush with the extended portion 34 of the lower side 32 of the perimeter wall 22 of the housing 12. The first plug 70 may be a micro usb plug, a Type C plug or any other plug commonly associated with charge ports on electronic device 16s.

A second cord 72 is wrapped around the second spool 58 when the second spool 58 rotates in the primary direction. The second cord 72 is urgeable off of the second spool 58 to rotate the second spool 58 in the secondary direction. The second cord 72 has a distal end 74 with respect to the second spool 58. The second cord 72 extends outwardly through a respective one of the conductor apertures 40 in the extended portion 34 of the lower side 32 of the perimeter wall 22 of the housing 12 having the distal end 74 of the second cord 72 being exposed. The second cord 72 is in electrical communication with the first cord 66. A second plug 76 is electrically coupled to the distal end 68 of the second cord 72 and the second plug 76 can be electrically coupled to a power source 78 for charging the electronic device 16. The second plug 76 is insertable into the second well 38 for storage having a back side 14 of the second plug 76 being flush with the extended portion 34 of the lower side 32 of the perimeter wall 22 of the housing 12. The second plug 76 may be a usb plug or the like and the power source 78 may be a usb charger.

In use, the back wall 20 of the housing 12 is attached to the back side 14 of the electronic device 16, or more specifically, the back side of a case for the electronic device 16. The first plug 70 is gripped and the first cord 66 is drawn outwardly a distance sufficient to plug the first plug 70 into the charge port 80 on the electronic device 16. The second plug 76 is gripped and the second cord 72 is drawn outwardly a distance sufficient to plug the second plug 76 into the power source 78. In this way the electronic device 16 can be charged from any usb power source 78 without the need to carry a charge cord. The button 44 is depressed to retract each of the first and second cord 72s, and each of the first 70 and second 76 plugs is inserted into the respective first 36 and second 38 well for storage.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A multiple unit charge cord assembly being configured to be mounted to an electronic device, said assembly comprising:
   a housing being coupled to a back side of an electronic device wherein said housing is configured to be transported with the electronic device, said housing having a front wall, a back wall and a perimeter wall extending therebetween, said back wall being positioned on the back side of the electronic device wherein said housing is configured to facilitate the front side of the electronic device to be visible, said perimeter wall having a first lateral side, a second lateral side and a lower side, said lower side having an extended portion extending away from said lower side, said extended portion being centrally positioned on said lower side;

a button being movably coupled to said housing wherein said button is configured to be pushed by a user, said button being urgeable into a releasing position;

a first spool being rotatably positioned within said housing, said first spool being biased to rotate in a first direction when said button is urged into said releasing position, said first spool being rotatable in a second direction opposite said first direction;

a second spool being rotatably positioned within said housing, said second spool being biased to rotate in said first direction when said button is urged into said releasing position, said second spool being rotatable in said second direction;

a first cord being wrapped around said first spool when said first spool rotates in said first direction, said first cord being urgeable off of said first spool to rotate said first spool in said second direction;

a first plug being electrically coupled to said distal end of said first cord wherein said first plug is configured to be electrically coupled to the electronic device;

a second cord being wrapped around said second spool when said second spool rotates in said first direction, said second cord being urgeable off of said second spool to rotate said second spool in said second direction;

a second plug being electrically coupled to said distal end of said second cord wherein said second plug is configured to be electrically coupled to a power source for charging the electronic device;

said lower side having a first well extending inwardly toward an interior of said housing, said first well being positioned between said extended portion and said first lateral side;

said lower side having a second well extending inwardly toward said interior of said housing, said second well being positioned between said extended portion and said second lateral side;

said lower side having a pair of conductor apertures each extending into said interior of said housing, each of said conductor apertures being positioned on said extended portion; and said front wall has an opening extending into said interior of said housing.

2. The assembly according to claim 1, wherein said button has a forward wall and an outer wall extending away from said forward wall, said outer wall being continuously arcuate about a center point of said forward wall such that said button has a circular shape, said outer wall having a distal edge with respect to said forward wall, said outer wall having a lip extending outwardly therefrom, said lip being aligned with said distal edge, said lip extending around an entire circumference of said outer wall, said outer wall extending through said opening in said front wall of said housing having said lip being positioned within said housing and having said forward wall being exposed.

3. The assembly according to claim 1, wherein:
said first spool has a rotational axis extending through said front and back walls of said housing; and said second spool has a rotational axis extending through said front and back walls of said housing, said first spool being positioned between said second spool and said back wall of said housing.

4. The assembly according to claim 2, further comprising a biasing unit being positioned between said second spool and said forward wall of said button, said biasing unit biasing said button away from said second spool such that said lip on said outer wall of said button frictionally engages said front wall of said housing, each of said first and second spools being inhibited from rotating in said respective first and primary directions when said button is biased away from said second spool, said lip being spaced from said front wall of said housing when said forward wall of said button is depressed thereby facilitating each of said first and second spools to rotate in said respective first and primary directions.

5. The assembly according to claim 1, wherein:
said first cord has a distal end with respect to said first spool, said first cord extending outwardly through a respective one of said conductor apertures in said extended portion of said lower side of said perimeter wall of said housing having said distal end of said first cord being exposed;

said first plug is insertable into said first well for storage having a back side of said first plug being flush with said extended portion of said lower side of said perimeter wall of said housing.

6. The assembly according to claim 5, wherein:
said second cord has a distal end with respect to said second spool, said second cord extending outwardly through a respective one of said conductor apertures in said extended portion of said lower side of said perimeter wall of said housing having said distal end of said second cord being exposed, said second cord being in electrical communication with said first cord;

said second plug is insertable into said second well for storage having a back side of said second plug being flush with said extended portion of said lower side of said perimeter wall of said housing.

7. A multiple unit charge cord assembly being configured to be mounted to an electronic device, said assembly comprising:
a housing being coupled to a back side of an electronic device wherein said housing is configured to be transported with the electronic device, said housing having a front wall, a back wall and a perimeter wall extending therebetween, said back wall being positioned on the back side of the electronic device wherein said housing is configured to facilitate the front side of the electronic device to be visible, said perimeter wall having a first lateral side, a second lateral side and a lower side, said lower side having an extended portion extending away from said lower side, said extended portion being centrally positioned on said lower side, said lower side having a first well extending inwardly toward an interior of said housing, said first well being positioned between said extended portion and said first lateral side, said lower side having a second well extending inwardly toward said interior of said housing, said second well being positioned between said extended portion and said second lateral side, said lower side having a pair of conductor apertures each extending into said interior of said housing, each of said conductor apertures being positioned on said extended portion, said front wall having an opening extending into said interior of said housing;

a button being movably coupled to said housing, said button having a forward wall and an outer wall extending away from said forward wall, said outer wall being continuously arcuate about a center point of said forward wall such that said button has a circular shape, said outer wall having a distal edge with respect to said forward wall, said outer wall having a lip extending outwardly therefrom, said lip being aligned with said distal edge, said lip extending around an entire circumference of said outer wall, said outer wall extending through said opening in said front wall of said housing having said lip being positioned within said housing and having said forward wall being exposed wherein said forward wall is configured to be pushed by a user;

a first spool being rotatably positioned within said housing, said first spool being biased to rotate in a first direction, said first spool being rotatable in a second direction opposite said first direction, said first spool having a rotational axis extending through said front and back walls of said housing;

a second spool being rotatably positioned within said housing, said second spool being biased to rotate in said first direction, said second spool being rotatable in said second direction, said second spool having a rotational axis extending through said front and back walls of said housing, said first spool being positioned between said second spool and said back wall of said housing;

a biasing unit being positioned between said second spool and said forward wall of said button, said biasing unit biasing said button away from said second spool such that said lip on said outer wall of said button frictionally engages said front wall of said housing, each of said first and second spools being inhibited from rotating in said first direction when said button is biased away from said second spool, said lip being spaced from said front wall of said housing when said forward wall of said button is depressed thereby facilitating each of said first and second spools to rotate in said first direction;

a first cord being wrapped around said first spool when said first spool rotates in said first direction, said first cord being urgeable off of said first spool to rotate said first spool in said second direction, said first cord having a distal end with respect to said first spool, said first cord extending outwardly through a respective one of said conductor apertures in said extended portion of said lower side of said perimeter wall of said housing having said distal end of said first cord being exposed;

a first plug being electrically coupled to said distal end of said first cord wherein said first plug is configured to be electrically coupled to the electronic device, said first plug being insertable into said first well for storage having a back side of said first plug being flush with said extended portion of said lower side of said perimeter wall of said housing;

a second cord being wrapped around said second spool when said second spool rotates in said first direction, said second cord being urgeable off of said second spool to rotate said second spool in said second direction, said second cord having a distal end with respect to said second spool, said second cord extending outwardly through a respective one of said conductor apertures in said extended portion of said lower side of said perimeter wall of said housing having said distal end of said second cord being exposed, said second cord being in electrical communication with said first cord; and a second plug being electrically coupled to said distal end of said second cord wherein said second plug is configured to be electrically coupled to a power source for charging the electronic device, said second plug being insertable into said second well for storage having a back side of said second plug being flush with said extended portion of said lower side of said perimeter wall of said housing.

\* \* \* \* \*